US009754326B2

(12) United States Patent
Franco et al.

(10) Patent No.: US 9,754,326 B2
(45) Date of Patent: Sep. 5, 2017

(54) AGGREGATE PROVIDER FOR SOCIAL ACTIVITY FEEDS AND CONTACT INFORMATION

(75) Inventors: Roberto Anthony Franco, Seattle, WA (US); Govind Varshney, Sammamish, WA (US); Anatoliy Burukhin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1073 days.

(21) Appl. No.: 13/293,493

(22) Filed: Nov. 10, 2011

(65) Prior Publication Data

US 2013/0124640 A1    May 16, 2013

(51) Int. Cl.
*G06F 15/16* (2006.01)
*G06Q 50/00* (2012.01)
*G06Q 10/10* (2012.01)

(52) U.S. Cl.
CPC ........... *G06Q 50/01* (2013.01); *G06Q 10/107* (2013.01)

(58) Field of Classification Search
CPC .............................. G06Q 10/10; G06Q 50/01
USPC ................................................ 709/206, 204
See application file for complete search history.

(56) References Cited

U.S. PATENT DOCUMENTS

| 7,673,327 | B1 | 3/2010 | Polis et al. |
| 7,730,216 | B1 | 6/2010 | Issa |
| 7,974,983 | B2 | 7/2011 | Goeldi |
| 2002/0133605 | A1 | 9/2002 | Khanna et al. |
| 2004/0268246 | A1* | 12/2004 | Leban ................. G06F 17/2247 715/239 |
| 2005/0216550 | A1 | 9/2005 | Paseman |
| 2006/0224675 | A1 | 10/2006 | Fox et al. |
| 2006/0265489 | A1* | 11/2006 | Moore .................... H04L 69/40 709/223 |

(Continued)

FOREIGN PATENT DOCUMENTS

| CN | 102033894 A | 4/2011 |
| CN | 102160077 A | 8/2011 |

(Continued)

OTHER PUBLICATIONS

Cui et al.; "Linked Internet US: A Mobile user Interface Optimized for Social Networking" published Sep. 7, 2010, 10 pages.

(Continued)

*Primary Examiner* — Davoud Zand
(74) *Attorney, Agent, or Firm* — Merchant & Gould P.C.

(57) ABSTRACT

A method is presented for obtaining contact information on a client computer. A request is received to display contact information for a person on an email application running on the client computer. A determination is made as to whether third party contact information is available for a user of the email application. Instructions are obtained from a server computer for obtaining the third party contact information from a third party computer associated with a social network. Instructions are obtained from the server computer for formatting the third party contact information on the client computer. Using the instructions from the server computer for obtaining the third party contact information, the third party contact information is obtained from the third party computer. Using the instructions from the server computer for formatting the third party contact information, the obtained third party contact information is formatted and displayed on the client computer.

20 Claims, 8 Drawing Sheets

(56) References Cited

U.S. PATENT DOCUMENTS

| | | | |
|---|---|---|---|
| 2007/0061487 A1* | 3/2007 | Moore | G06F 17/30575 709/246 |
| 2009/0030933 A1* | 1/2009 | Brezina | H04M 15/00 |
| 2009/0138475 A1 | 5/2009 | Caulkins | |
| 2009/0171691 A1 | 7/2009 | Lubarski et al. | |
| 2009/0177744 A1 | 7/2009 | Marlow | |
| 2009/0254572 A1* | 10/2009 | Redlich | G06Q 10/06 |
| 2010/0114788 A1 | 5/2010 | White | |
| 2010/0153284 A1 | 6/2010 | Hoag et al. | |
| 2010/0312644 A1 | 12/2010 | Borgs | |
| 2011/0167114 A1 | 7/2011 | Blanchard, III | |
| 2011/0196868 A1 | 8/2011 | Hans et al. | |
| 2012/0109996 A1* | 5/2012 | Asterbadi | G06Q 10/10 707/769 |
| 2012/0117497 A1* | 5/2012 | Uola | G06F 9/4443 715/762 |
| 2012/0294495 A1* | 11/2012 | Wren et al. | 382/118 |
| 2012/0303652 A1* | 11/2012 | Tseng | G06Q 30/02 707/769 |
| 2013/0239178 A1* | 9/2013 | LaRosa | 726/4 |

FOREIGN PATENT DOCUMENTS

| | | |
|---|---|---|
| JP | 2006236320 A | 9/2006 |
| JP | 2007509432 A | 4/2007 |
| JP | 2009506427 A | 2/2009 |
| JP | 2009245220 A | 10/2009 |
| KR | 20110093630 A | 8/2011 |
| KR | 20110103611 A | 9/2011 |
| WO | 2007024608 A1 | 3/2007 |
| WO | 2009108534 A2 | 9/2009 |
| WO | 2011109802 A1 | 9/2011 |

OTHER PUBLICATIONS

"First Office Action and Search Report Issued in Chinese Patent Application No. 201210448633.X", Mailed Date: May 14, 2015, 12 Pages.
International Search Report and Written Opinion for PCT/US2012/064008 mailed Feb. 25, 2013.
"Supplementary Search Report Issued in European Patent Application No. 12848309.6", Mailed Date: Jun. 26, 2015, 7 Pages.
Office Action Issued in Japanese Patent Application No. 2014-541212, Mailed Date: Oct. 6, 2016, 9 pages.
"Office Action Issued in Japanese Patent Application No. 2014-541212", Mailed Date: Feb. 16, 2017, 5 pages.
Office Action Issued in European Patent Application No. 12848309.6, Mailed Date: Apr. 10, 2017, 9 pages.

* cited by examiner

AGGREGATE PROVIDER FOR SOCIAL ACTIVITY FEEDS AND CONTACT INFORMATION

BACKGROUND

Users may have accounts on a plurality of social networks. Typically, a user connects to each social network separately and brings up a web page for the user. The web page typically displays contact and activity feed information for people and organizations in the user's social network.

Because of the popularity of social networking, users may want to check their social networks multiple times during the day. However, periodically connecting to a plurality of social networks can be time consuming.

Integrating social networking information into a common working platform is one approach to providing social networking updates in a more efficient manner. However, integrating social networks with a platform, such as an email application, may require the installation of additional software that users may not be motivated to use and that may not be available from some social networks.

SUMMARY

Embodiments of the disclosure are directed to a method for obtaining contact information on a client computer. On the client computer, a request is received to display contact information for a person on an email application running on the client computer. A determination is made as to whether third party contact information is available for a user of the email application. When a determination is made that third party contact information is available for the user, instructions are obtained from a server computer for obtaining the third party contact information from a third party computer associated with a social network. The server computer is different than the third party computer. Instructions are obtained from the server computer for formatting the third party contact information on the client computer. Using the instructions from the server computer for obtaining the third party contact information, the third party contact information is obtained from the third party computer. Using the instructions from the server computer for formatting the third party contact information, the obtained third party contact information is formatted and displayed on the client computer.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DETAILED DESCRIPTION

The present application is directed to systems and methods for displaying social networking information on an email application on a client computer. The social networking information, typically contact messages and activity feed data, is obtained from one or more third party computers without requiring additional software components to be installed on the client computer. The systems and methods can also be used for displaying social networking information on applications besides email applications. Examples include word processing applications, notebook applications and drawing applications. Other examples are possible.

The social networking information may be obtained directly from the third party computers or from a server computer that accesses the third party computers. In one embodiment, the server computer provides the client computer with instructions for accessing the third party computers and for formatting the social networking information obtained from the third party computers. In another embodiment, the server computer may obtain the social networking information directly from the third party computers and transform the social networking information into a format that can be used on the client computer.

The systems and methods permit social networking information to be obtained from a plurality of third party computers, corresponding to different social networks. Example social networks include Facebook, My Space, Windows Live Messenger Social, LinkedIn, Twitter, and Google+. Other social networks are possible. When the social networking information is obtained from a plurality of third party computers, the social networking information is aggregated and identified on the client computer. In this disclosure, the term third party computers refers to one or more server computers associated with the social networks from which the social networking information is obtained.

Figure 1:
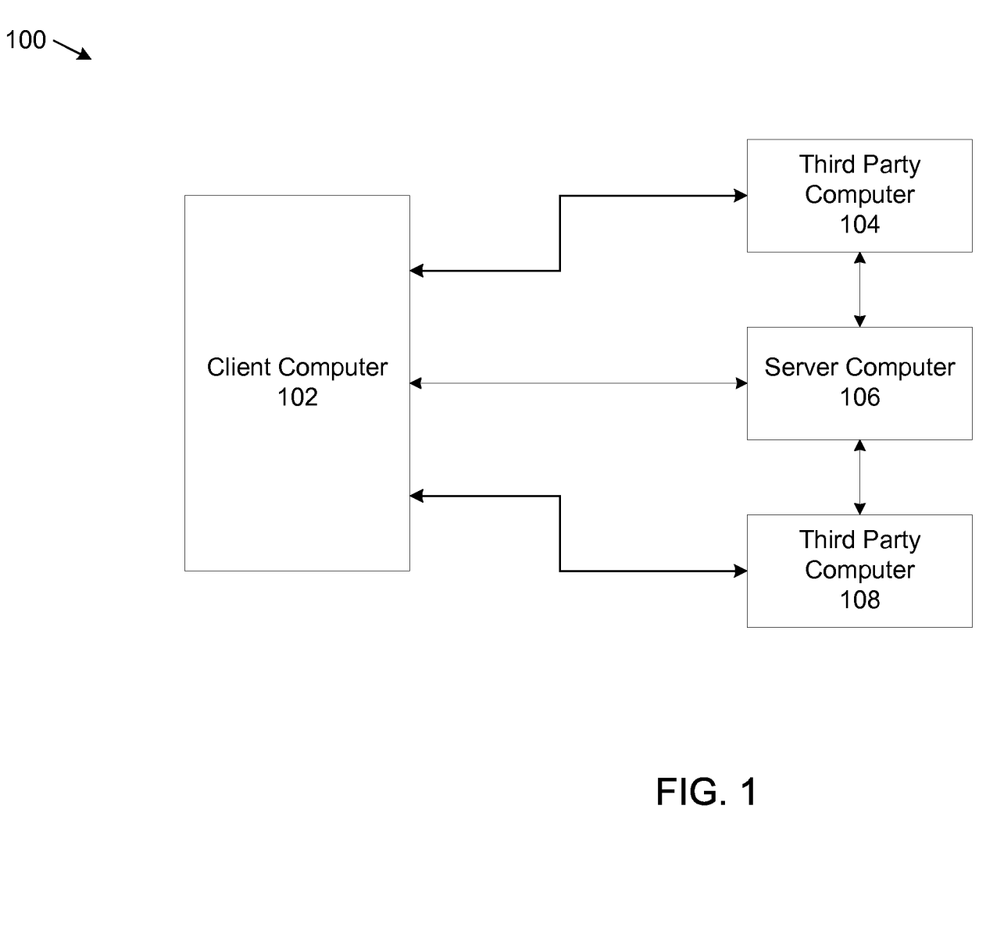
FIG. 1 shows an example system that supports the display of social networking information on an email application on a client computer.

FIG. 1 is an example of a system 100 that supports the display of social networking information on an email application on a client computer. The example system 100 includes a client computer 102, third party computers 104, 108 and server computer 106. More client computers and server computers and more or fewer third party computers are possible.

The example client computer 102 runs an email application, such as the Outlook® personal information manager from Microsoft Corporation of Redmond, Wash. The example third party computers 104, 108 are typically server computers associated with third party social networks. In examples, third party computers 104, 108 may comprise a plurality of server computers or a server farm.

The example server computer 106 is typically a server computer that is maintained by an entity that owns or is associated with the email application. The server computer 106 includes software that maintains a list of available social networks. In examples, the server computer 106 also includes rules for transforming data received from one or more of the available social networks into a format compatible with display on the email application of the client computer 102. For example, the server computer 106 may include transformation rules or instructions for determining whether a person on a social network, for example a Facebook friend or a LinkedIn contact, is the same person as a contact associated with the email application, for example an Outlook® contact. As another example, the server computer 106 may transform an icon for a contact in a social network to a corresponding icon for the contact in the email application. In examples, server computer 106 may comprise a plurality of server computers.

The server computer 106 also stores version information for the social networks and provides transformation rules or instructions corresponding to a social network version. For example, if contact is referred to as a friend in one version of a social network and is referred to as a buddy in another version of the social network, the server computer 106 is able to properly determine whether the friend or the buddy is a contact associated with the email application, for example an Outlook® contact. In examples, the instructions may be included in a style sheet or script on server computer 106.

In a preferred embodiment, the client computer 102 connects to one or more of third party computers 104, 108 and obtains social networking information from third party computers 104, 108. Typically, the client computer 102 connects to third party computers 104, 108 based on an activation event, for example a user action at client computer 102. An example activation event is when a user of the email application on client computer 102 selects an email message on the email application. Another example is when a user selects or identifies a contact in a contact list on the email application. Other activation events are possible.

When the user action occurs, client computer 102 sends a request to server computer 106 to obtain connection information for any social networks available for a user associated with the user action. In examples, server computer 106 maintains a list of social networks available for one or more users. The server computer 106 also stores connection information for these social networks. An available social network is typically a social network for which a user has registered or has an account. When server computer 106 determines that the user has an active account on one or more of these social networks, server computer 106 sends information, typically API (application program interface) instructions for connecting to the one or more social networks to client computer 102.

In examples, during installation or operation of the email application, the user of the email application enters user IDs and passwords for social networks associated with the user. In examples, the user IDs and passwords may be directly entered into the email application and sent to the server computer 106. In other examples, the user IDs and passwords may be entered and stored on server computer 106.

When client computer 102 connects to the third party computers 104, 108 based on the user action, client computer 102 also accesses server computer 106 for rules or instructions for processing data received from third party computers 104, 108. The rules or instructions permit client computer 102 to process and format the data received from the third party computers 104, 108. To obtain the rules and instructions, as explained later herein, server computer 106 establishes communications with third party computers 104, 108 and obtains rules and instruction updates from third party computers 104, 108. In examples, server computer 106 may install one or more plug-ins to obtain information from third party computers 104, 108.

Figure 2:
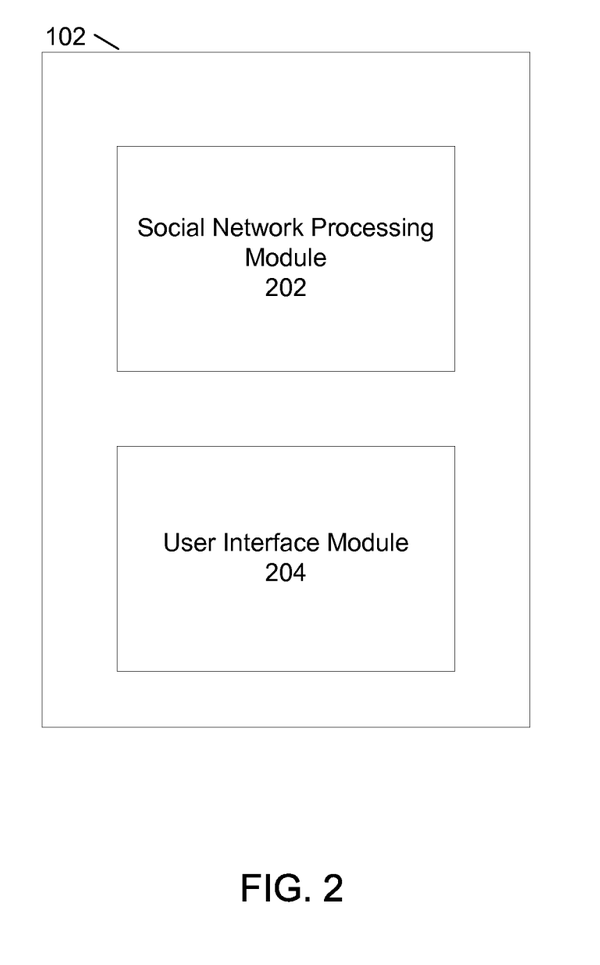
FIG. 2 shows example components of the client computer of FIG. 1.

FIG. 2 shows example modules of client computer 102. The example client computer 102 includes an example social network processing module 202 and an example user interface module 204. The example social network processing module 202 uses information obtained from server computer 106 to access social networking data from third party computers 104, 108, aggregate the data and format the data for display on client computer 102. In examples, the social networking processing module 202 obtains a list of available social networks from server computer 106 and API instructions for connecting to the available social networks. When social networking data from the third party computers is received at client computer 102, the social network processing module 202 aggregates the data and formats the data for display on the client computer 102. When aggregating and formatting the data, the social network processing module 202 makes use of the transformation rules or instructions obtained from server computer 106.

The example user interface module 204 displays the social networking information received from the third party computers. In examples, the user interface module 204 displays the social networking information in a separate window, for example a people pane, on the email application running on client computer 1002. The people pane is a window in the email application in which social information for a person may be displayed. Other ways of displaying the social networking information are possible.

Figure 3:
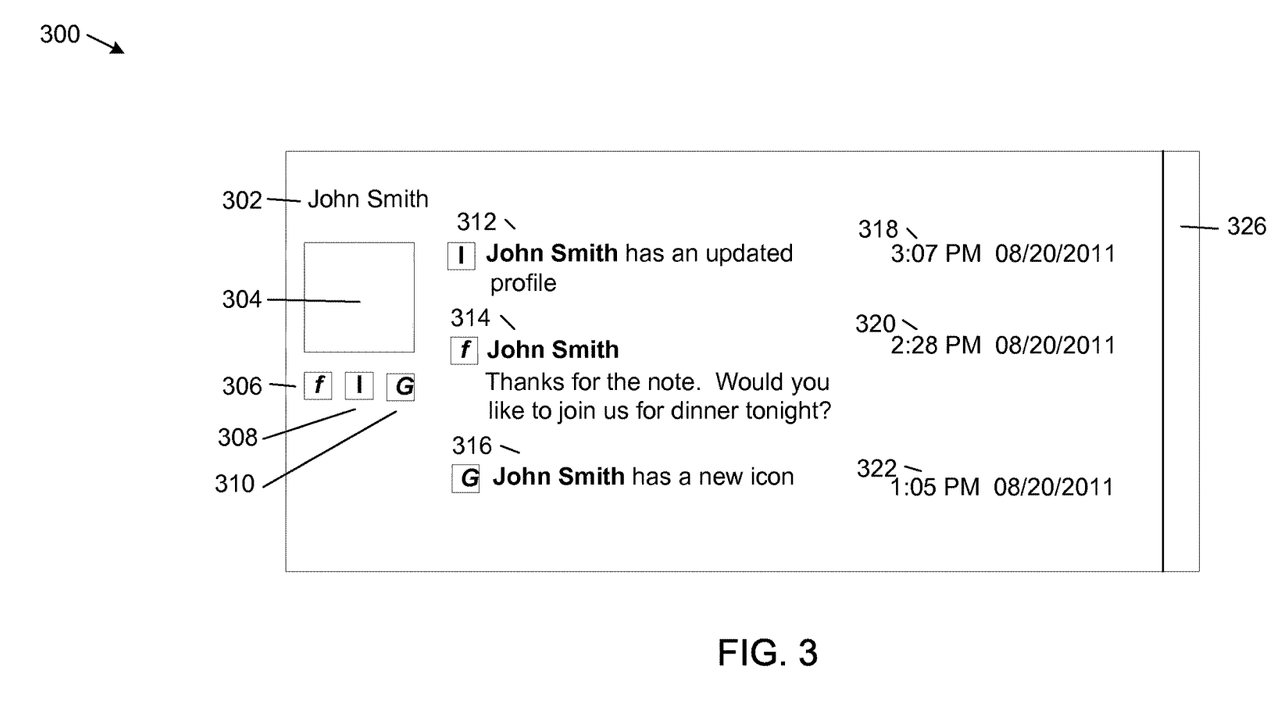
FIG. 3 shows an example user interface display of social networking information for the email application of the client computer of FIG. 1.

FIG. 3 is an example user interface display 300 for displaying social networking information on the email application running on client computer 1002. In examples, the user interface display 300 may correspond to the people pane of the email application. The example user interface display 300 includes the user's name 302 and a photo 304 of the user. Other information about the user, such as a job title, home address, phone number, etc., may also be displayed.

The user interface display 300 also includes example icons 306, 308, 310 corresponding to available social networks for the user. For example, example icon 306 represents Facebook, example icon 308 represents LinkedIn and example icon 310 represents Google+. Other icons are possible.

The user interface display 300 includes three example social networks for the user. Example entry 312 is from LinkedIn and is shown with a LinkedIn icon, example entry 314 is from Facebook and is shown with a Facebook icon and example entry 316 is from Google+ and is shown with an example Google+ icon. Timestamps 318, 320 and 322 are also provided with the entries. In addition an example scrollbar 326 is provided. Other formats for user interface displays showing social networking information are possible.

Figure 4:
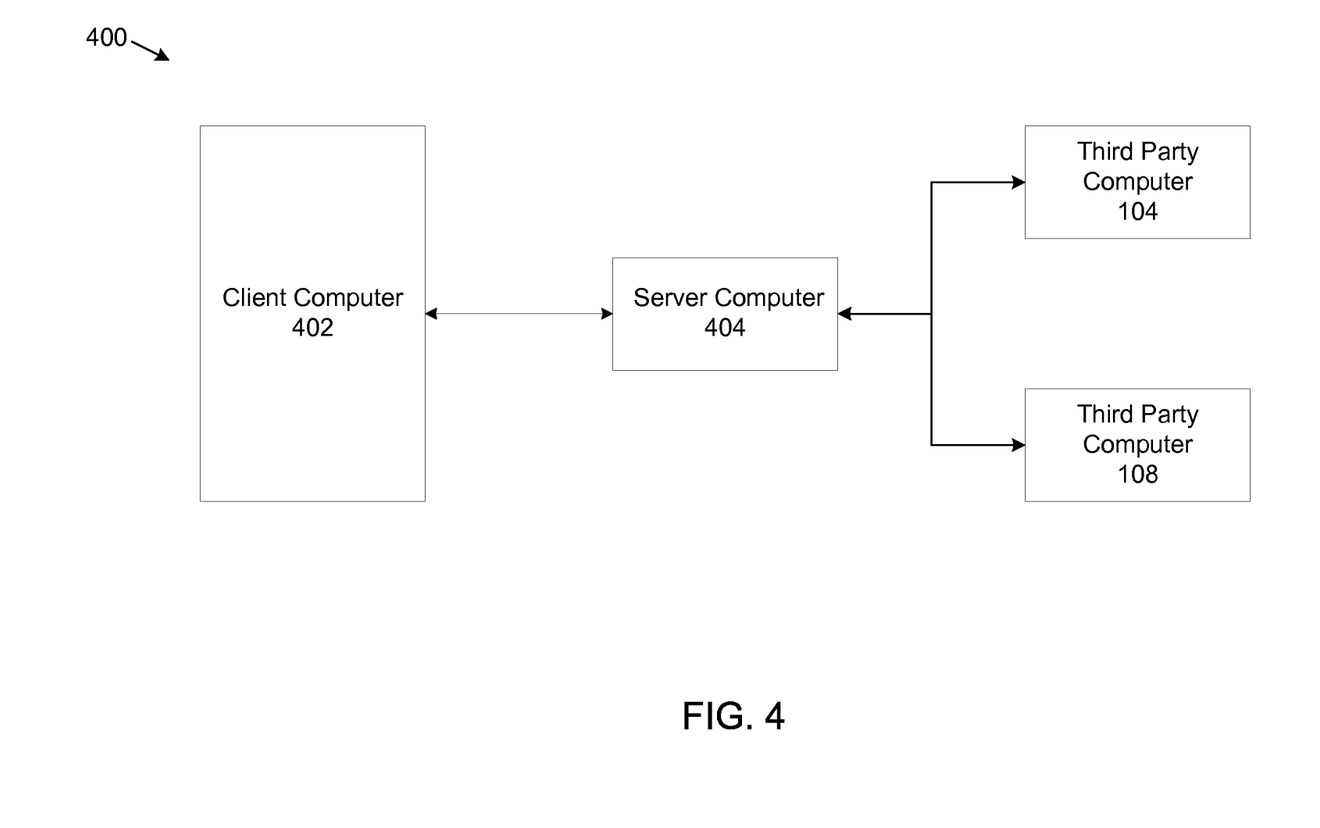
FIG. 4 shows an example system that supports an alternate embodiment for the display of social networking information on an email application on a client computer.

FIG. 4 is an example of a system 400 that supports an alternative embodiment for the display of social networking information on the email application of a client computer. The example system 400 includes client computer 402, server computer 404 and third party computers 104, 108.

The example client computer 402 runs an email application such as the Outlook® personal information manager from Microsoft Corporation of Redmond, Wash. The example third party computers 104, 108 are computers, typically server computers, associated with third party social networks. In examples, third party computers 104, 108 may comprise a plurality of server computers or a server farm.

The example server computer 404 accesses social networking data from third party computers 104, 108 and transforms the social networking data into a format compatible with an email application running on client computer 402. Thus, server computer 404 acts as an intermediary between client computer 402 and third party computers 104, 108. Server computer 404 is typically part of an Internet service that is maintained by an entity that supports the email application running on client computer 402.

Figure 5:
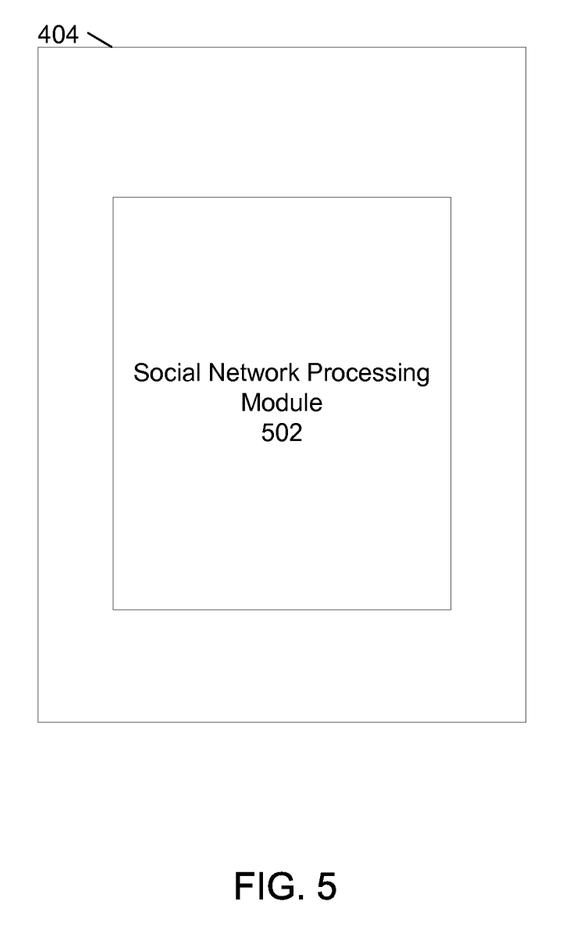
FIG. 5 shows an example server computer with a social network processing module.

FIG. 5 shows an example component of server computer 404. Server computer 404 includes an example social network processing module 502. The example social network processing module 502 connects to one or more social networks on behalf of a user on client computer 402, obtains social networking information from the one or more social networks on behalf of the user, formats the social networking information to be compatible with a user interface of an email application running on client computer 402 and sends the formatted social networking information to client computer 402. The social network processing module may also include one or more transformation rules or instructions for transforming data received from a third party computer for a social network, for example third party computers 104, 108, into data that can be aggregated and displayed on client computer 102. For example, the transformation rules or instructions may specify that how a friend icon on Facebook is to be transformed into a contact icon the Outlook® personal information manager.

In examples, the social network processing module 502 receives user IDs and passwords for social networks for which the user has accounts. The social networking processing module 502 connects to third party computers associated with the social networks, for example third party computers 104, 108 and obtains social networking information from the third party computers. The social network processing module 502 maintains versioning information for the social networks and receives version updates from the third party computers.

Figure 6:
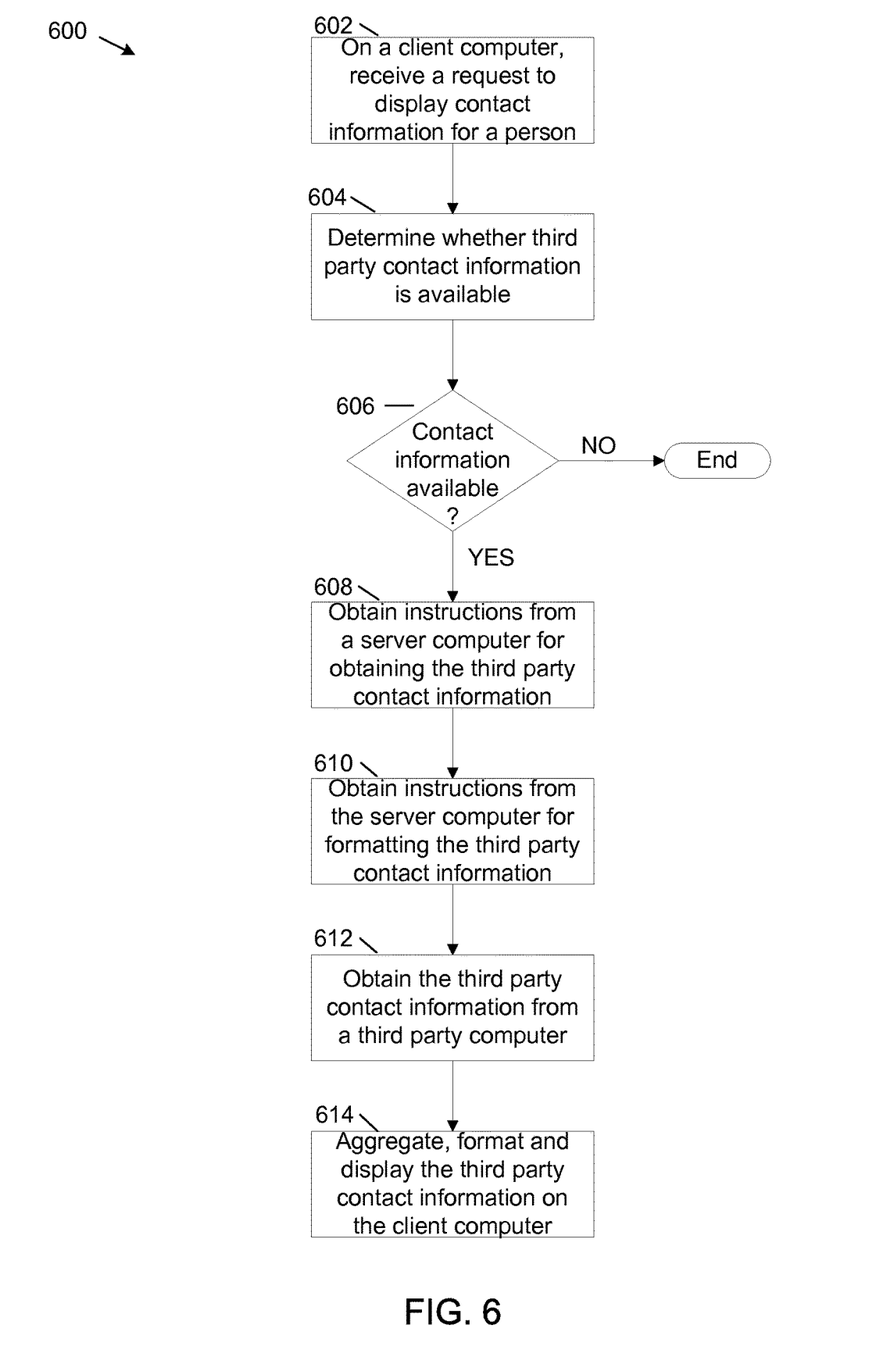
FIG. 6 shows an example flowchart of a method for aggregating social networking contact information and activity feeds at a client computer.

FIG. 6 shows an example flowchart of a method 600 for aggregating social networking contact information and activity feeds at a client computer. In this disclosure contact information may include personal information as well as specific information about a contact. Examples of personal information include date of birth, social activities, skills, technical expertise, etc. Other examples of personal information are possible. In the example method 600, the client computer obtains connectivity and formatting information from a server computer but obtains social networking information directly from one or more third party computers associated with social networks.

At operation 602, on a client computer, for example on client computer 102, a request is received to display contact information for a person. The request is typically based on a user action, such as selecting an email message or selecting a contact record for the person.

At operation 604, a determination is made as to whether third party contact information is available for the user. In this disclosure, third party contact information refers to social networking information available at third party computers associated with social networks. The availability of third party contact information refers to the user having an account on the social network. Messages, activity feed information or other contact information may or may not be available for the person at the third party computers.

Typically, during installation of an email application running on the client computer, the user of the email application enters a user ID and password information for one or more social networks associated with the user. In examples when the email application on the client computer determines that at least one user ID and password associated with third party contact information has been entered, a determination is made at operation 606 that third party contact information is available.

When a determination is made at operation 606 that third party contact information is available, at operation 608, instructions are obtained from a server computer, for example from server computer 106, for connecting to one or more third party computers for which the user has a user ID and password. Typically, the instructions are in the form of or include one or more application programming interface (API) commands for connecting to the third party computers.

At operation 610, instructions are obtained from the server computer for formatting the third party contact information. In examples, the instructions may take the form of rules for transforming the third party contact information to a format compatible for display on the client computer. In other examples, the instructions may take the form of a script that can be used to transform or format the third party contact information. Other types of instructions are possible.

At operation 612, the client computer, for example client computer 102, makes a connection to one or more third party computers, for example third party computers 104, 108, using the instructions obtained from server computer 106 and using the user IDs and passwords for the one or more third party computers entered into the email application running on the client computer. When contact information is available for the user on the one or more third party computers, at operation 612, client computer 102 obtains the contact information from the one or more third party computers.

At operation 614, the third party contact information is aggregated, formatted and displayed on client computer 102. Aggregating the third party contact information refers to collecting the third party contact information for the person, which may come from more than one third party computer, combining the third party contact information where appropriate and integrating the third party contact information with other contact information on the user interface of the client computer. The contact information is formatted to be consistent with icons and other components used with the email system running on the client computer.

Figure 7:
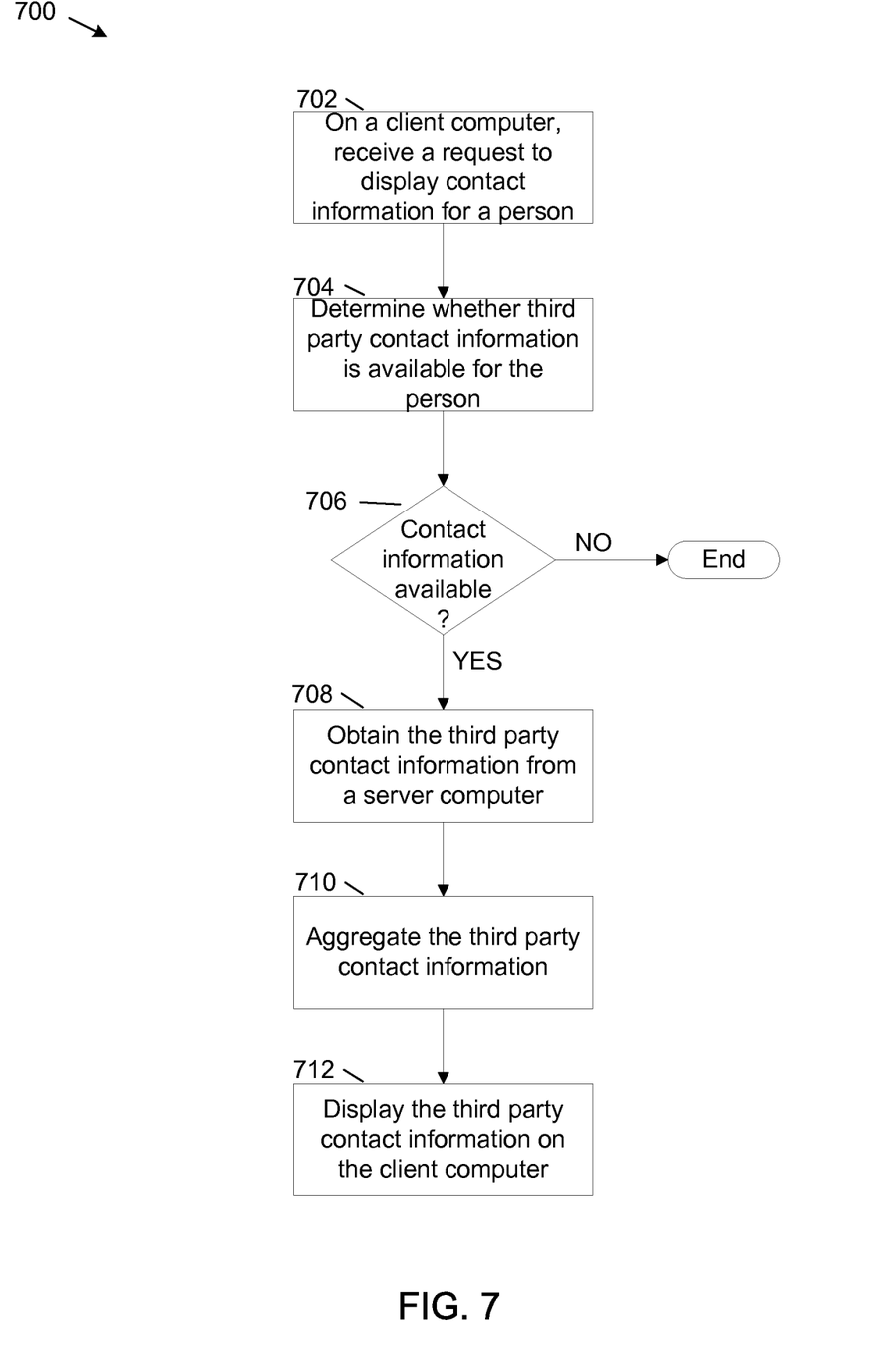
FIG. 7 shows an example flowchart of an alternate method for aggregating social networking contact information and activity feeds at a client computer.

FIG. 7 shows an example flowchart of a method 700 for aggregating social networking contact information and activity feeds at a client computer. In the example method 700, the client computer obtains aggregated and formatted third party contact information directly from a server computer.

At operation 702, on a client computer, for example on client computer 402, a request is received to display contact information for a person. The request is typically based on a user action, such as selecting an email message or selecting a contact record for the person.

At operation 704, a determination is made as to whether third party contact information is available for the user. In examples when the email application on the client computer determines that at least one user ID and password associated with third party contact information has been entered for the user, a determination is made at operation 706 that third party contact information is available.

At operation 708, if available, third party contact information is obtained from the server computer, for example from server computer 404. Server computer 404 uses the user IDs and passwords available for the person to access one or more third party computers, for example third party computers 104, 108, and obtain social networking information from the third party computers. The third party contact information may or may not be associated with the person. In examples, the server computer only obtains third party contact information associated with the person. In these examples, if no updates are available for the person, no third party contact information is obtained by the server computer. In other examples, the server computer obtains any new third party contact information for the user. The client computer may store the new third party contact information in a cache to be used when the obtained contact information is needed.

In examples, at operation 710, the server computer aggregates third party contact information that may be obtained from a plurality of third party computers. In other examples, at operation 710, the third party contact information is aggregated at the client computer.

At operation 712, the third party information is displayed on a user interface of the email application running on the client computer.

Figure 8:
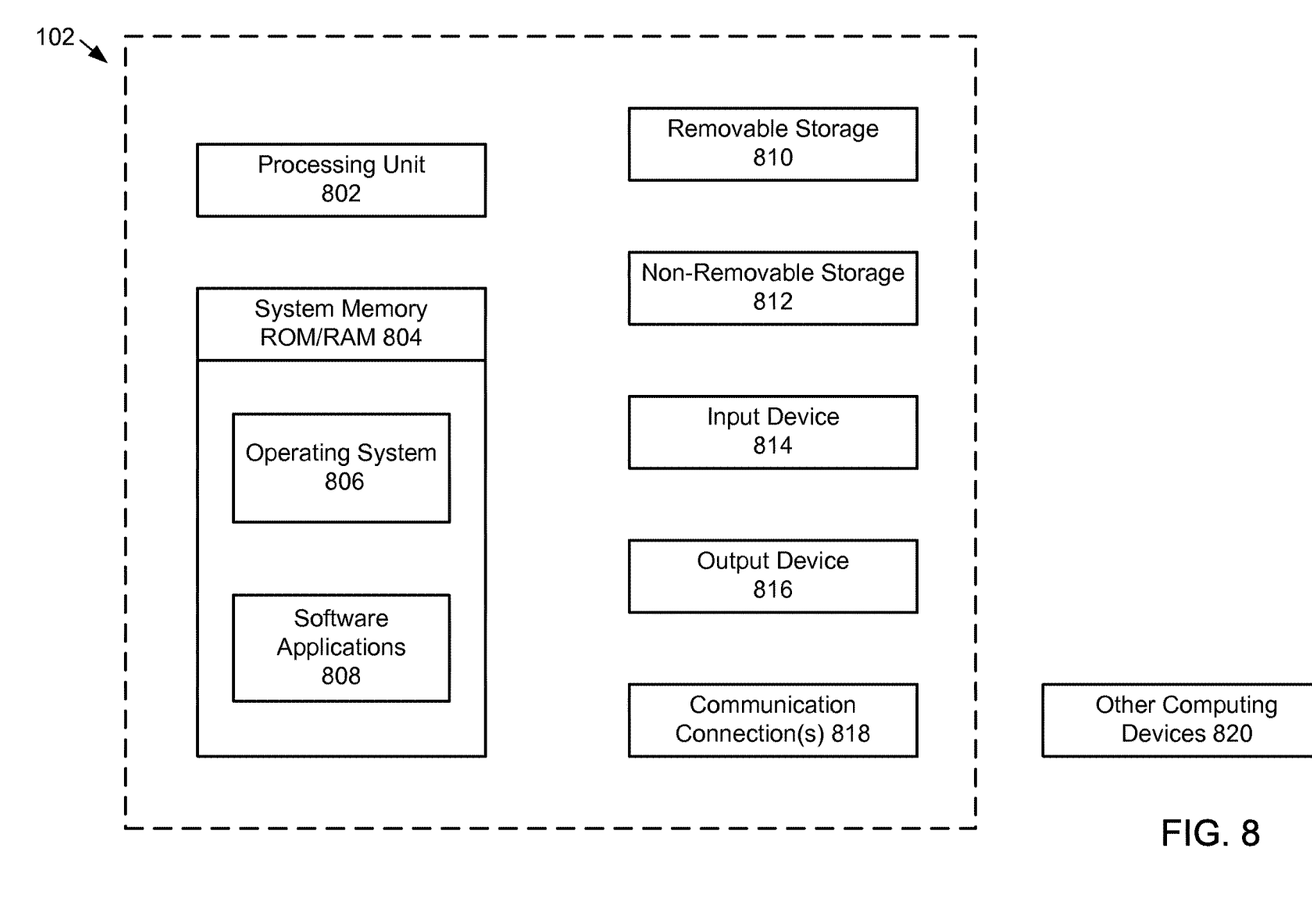
FIG. 8 shows example components of the client computer of FIG. 1.

With reference to FIG. 8, example components of client computer 102 are shown. In example embodiments, client computer 102 is a computing device. Client computer 102 can include input/output devices, a central processing unit ("CPU"), a data storage device, and a network device. Client computer 102 can also be a mobile computing device, such as a laptop, tablet, convertible, or other handheld device like a smartphone or cellular telephone.

In a basic configuration, client computer 102 typically includes at least one processing unit 802 and system memory 804. Depending on the exact configuration and type of computing device, the system memory 804 may be volatile (such as RAM), non-volatile (such as ROM, flash memory, etc.) or some combination of the two. System memory 804 typically includes an operating system 806 suitable for controlling the operation of a client computer. The system memory 804 may also include one or more software applications 808 and may include program data.

The client computer 102 may have additional features or functionality. For example, client computer 102 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 8 by removable storage 810 and non-removable storage 812. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client computer 102. Any such computer readable storage media may be part of client computer 102. Client computer 102 may also have input device(s) 814 such as keyboard, mouse, pen, voice input device, touch input device, etc. Output device(s) 816 such as a display, speakers, printer, etc. may also be included.

Consistent with embodiments of the present disclosure, the input device(s) 814 may comprise any motion detection device capable of detecting the movement or gesture of a user. For example, the input device(s) 814 may comprise a Kinect® motion capture device, from Microsoft Corporation, comprising a plurality of cameras and a plurality of microphones.

The client computer 102 may also contain communication connections 818 that allow the device to communicate with other computing devices 820, such as over a network in a distributed computing environment, for example, an intranet or the Internet. Communication connections 818 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 8 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the computing device 102 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:

1. A method for obtaining contact information on a client computer, the method comprising:
   on the client computer, receiving a request to display social networking information for a user on an email application running on the client computer;
   determining via the email application whether an account for a social network associated with the user is available to the user of the email application;
   when a determination is made via the email application that the account for the social network is available to the user:
   obtaining from a server computer instructions for obtaining third party social networking information from a third party computer associated with the social network, the server computer being different than the third party computer;
   obtaining from the server computer formatting instructions for formatting the third party social networking information to be compatible with a user interface of an email application on the client computer;
   using the instructions from the server computer for obtaining the third party social networking information from the third party computer;
   aggregating the third party social networking information with other contact information of the email application;

using the formatting instructions from the server computer for formatting the aggregated third party social networking information to be displayed in the user interface of the email application; and displaying the other contact information and formatted third party social networking information, having been aggregated together, via the user interface of the email application on the client computer.

2. The method of claim 1, wherein receiving a request to display social networking information for the user comprises determining that an activation event has been detected at the client computer, the activation event comprising a selection or an identification of the user on the client computer.

3. The method of claim 2, wherein the activation event comprises selecting an email message on the email application.

4. The method of claim 1, wherein determining whether an account associated for the social network is available to the user of the email application comprises determining whether a user ID and a password for accessing the third party computer has been entered for the user in the email application.

5. The method of claim 1, wherein the instructions for obtaining third party social networking information from the third party computer includes one or more application programming interface commands for connecting to the third party computer.

6. The method of claim 1, further comprising obtaining from the server computer a list of available social networks.

7. The method of claim 1, wherein the third party social networking information includes activity feed data for the user.

8. The method of claim 1, further comprising obtaining third party social networking information and activity feed information from one or more additional third party computers and aggregating the third party social networking information and activity feed data from the one or more additional third party computers on the client computer.

9. The method of claim 8, further comprising identifying the third party social networking information and activity feed data from each of the one or more third party computers via an icon displayed with the third party social networking information and activity feed data, the icon and the third party social networking information and activity feed data displayed on a user interface of the email application, the icon representing a social network corresponding to one of the third party computers.

10. The method of claim 1, wherein the third party social networking information is integrated with contact information from the email application.

11. The method of claim 1, wherein obtaining formatting information from a server computer comprises obtaining instructions from the server computer for transforming the third party social networking information into a format compatible with the client computer.

12. The method of claim 11, wherein the instructions include one or more rules for transforming the third party social networking information into a format compatible with display on the email application of the client computer.

13. The method of claim 11, wherein the instructions are in the form of a style sheet or script.

14. The method of claim 11, further comprising obtaining versioning information for the third party social networking information.

15. An electronic computing device comprising:
a processing unit; and
system memory, the system memory including instructions that, when executed by the processing unit, cause the electronic computing device to:
receive a request to display social networking information for a user;
determine via the email application whether an account for a social network associated with the user is available to the user of an email application running on the electronic computing device; and
when a determination is made via the email application that the account for the social network is available to the user:
request the third party social networking information for the user from a server computer, the server computer being different than a third party computer associated with the social network;
receive third party social networking information from the server computer, the third party social networking information received from the server computer comprising contact information for the user from social networks and formatting instructions for formatting the third party social networking information to be compatible with a user interface of an email application;
aggregate the third party social networking information with other contact information of the email application;
use the formatting instructions for formatting the aggregated third party social networking information to be displayed in the user interface of the email application; and
display the other contact information and formatted third party social networking information, having been aggregated together, via the user interface of the email application on the electronic computing device.

16. The method of claim 15, wherein receiving a request to display social networking information for a user comprises determining that an activation event has been detected at the client computer, the activation event comprising a selection or an identification of the person on the email application on the client computer.

17. The method of claim 15, wherein determining whether an account for a social network associated with the user is available for the user comprises determining whether a user ID and password has been entered for the user in the email application running on the client computer.

18. The method of claim 15, further comprising obtaining activity feed data from the server computer.

19. The method of claim 15, wherein the third party social networking information received from the server computer is formatted and ready to be displayed on the user interface of the email application.

20. A computer readable storage device, not including a propagated signal, comprising instructions that, when executed by an electronic computing device, cause the electronic computing device to:
receive a request to display social networking information for a user on an email application running on the electronic computing device, the request comprising determining that an activation event has been detected at the electronic computing device, the activation event comprising a selection or an identification of the user on the electronic computing device;

determine via the email application whether an account for a social network associated with the user is available to the user of the email application, the determination as to whether the account for the social network associated with the user is available to the user of the email application comprising determining whether a user ID and a password for accessing the third party computer has been entered for the user in the email application;

when a determination is made via the email application that the account for the social network is available for the user:

obtain from a server computer instructions for obtaining the third party social networking information from a third party computer, the instructions including one or more application programming interface commands for connecting to the third party computer, the server computer being different than the third party computer;

obtain from the server computer a list of available social networks;

obtain from the server computer formatting instructions for formatting the third party social networking information on the electronic computing device, the formatting instructions including one or more rules for transforming the third party social networking information into a format compatible with a user interface of the email application of the electronic computing device, the formatting instructions being in the form of a style sheet or script;

use the instructions from the server computer for obtaining the third party social networking from the third party computer, the third party social networking information including activity feed data for the user;

use the instructions from the server computer for obtaining the third party social networking information and activity feed information from one or more additional third party computers;

after obtaining the formatting instructions for formatting the third party social networking information, identify the third party social networking information and activity feed data from each of the one or more third party computers via an icon displayed with the third party social networking information and activity feed data, the icon and the third party social networking information and activity feed data displayed on the user interface of the email application, the icon representing a social network corresponding to one of the third party computers; and     aggregate the third party social networking information with other contact information of the email application;

after obtaining the formatting instructions for formatting the third party social networking information, format the obtained third party social networking information to be displayed in the user interface of the email application; and     display the other contact information and formatted third party social networking information, having been aggregated together, via the user interface of the email application on the electronic computing device.

* * * * *